(12) United States Patent
Chwala

(10) Patent No.: US 6,558,769 B1
(45) Date of Patent: May 6, 2003

(54) RECEPTACLE FOR THE COLLECTION OF FLUIDS

(76) Inventor: Kevin Chwala, 10365 Church Rd., Barrington Hills, IL (US) 60010

( * ) Notice: Subject to any disclaimer, the term of this patent is extended or adjusted under 35 U.S.C. 154(b) by 146 days.

(21) Appl. No.: 09/794,814

(22) Filed: Feb. 28, 2001

(51) Int. Cl.$^7$ ................................................ B32B 1/04
(52) U.S. Cl. ...................... 428/137; 428/119; 428/138; 184/106; 180/69.1; 220/573; 296/38
(58) Field of Search ......................... 428/99, 119, 137, 428/138; 180/69.1; 184/106; 296/38; 220/573

(56) References Cited

U.S. PATENT DOCUMENTS

| | | |
|---|---|---|
| 4,246,982 A | 1/1981 | Pretnick |
| 4,798,754 A | 1/1989 | Tomek |
| 5,266,378 A | 11/1993 | Stephenson et al. |
| 5,308,670 A | 5/1994 | Saylor |
| 5,350,619 A | 9/1994 | Rasmussen |
| 5,478,625 A | 12/1995 | Wright |
| 5,556,692 A | 9/1996 | Zheng |
| 5,626,933 A | 5/1997 | Long |
| 6,120,876 A | 9/2000 | Walton |

Primary Examiner—Alexander S. Thomas

(57) ABSTRACT

In accordance with the present invention a receptacle for the collection of fluids is provided. The receptacle includes a frame with an opening defined between a pair of sidewalls and the front and rear walls supported by the frame. The receptacle also includes a lower grate, a sorbent pad and an upper grate, all of which is received in the basin of the frame. The sorbent pad sandwiched between the upper and lower grate is prevented from moving and kept substantially flat, such that the sorbent pad may cover the entire opening. The front and rear walls further include tapered sections to secure the receptacle to the ground. In addition, the upper grate may also be hinged to the frame, providing an easier means to access the sorbent pad for periodic maintenance purposes. The preferred sorbent pad has properties that absorb various petroleum-based fluids while at the same time allowing water-based fluids to drain or seep through. The water may thereafter drain out of the frame through drain holes provided along the sidewalls or through the opening.

20 Claims, 4 Drawing Sheets

RECEPTACLE FOR THE COLLECTION OF FLUIDS

FIELD OF THE INVENTION

This invention relates to a receptacle for the collection of fluids that may drip or fall from a vehicle or machine, and more importantly to an improved receptacle that collects fluids and waste but allows water to drain therefrom.

BACKGROUND OF THE INVENTION

Areas such as drive-throughs, toll booths, ticket booths in front of parking garages, residential and commercial driveways may exhibit heavy stop and go traffic, as well as areas around and under machines. Liquids falling from vehicles traveling through these areas or from machines may include petroleum or glycol-based fluids, waste liquids, dirt, salt and/or water. Typically, these areas require frequent high-pressure cleaning or re-surfacing because these liquids in general have a tendency to deteriorate the pavement or ground if left unattended. However, most water-based fluids are not harmful to the pavement and therefore do not have to be cleaned away. Since the costs associated with re-surfacing or frequent high-pressure cleaning is high, the need exists to provide a means for keeping these areas relatively clean, without the high costs associated with current methods. While there exists prior art encompassing drip mats, pans, and pads, these are typically used for low traffic areas, such as a garage or residential driveway, such that if employed and used in heavy traffic areas these mats and pads would not properly function as they were originally intended or would still require extensive maintenance.

For instance, U.S. Pat. No. 5,478,625 to Wright is directed to a vehicle drip mat for collecting all liquids falling from a parked vehicle; U.S. Pat. No. 4,246,982 to Pretnick is directed to a car ramp and drip pan assembly for collecting all liquids falling from a parked vehicle; U.S. Pat. No. 6,120,876 to Walton is directed to a garage floor protector; U.S. Pat. No. 5,350,619 to Rasmussen is directed to a mat for the collection of liquids falling from an airplane; U.S. Pat. No. 5,556,692 to Zheng is directed to a dual purpose parking pad; and U.S. Pat. No. 5,626,933 to Long, U.S. Pat. No. 5,266,378 to Stephenson et al. and U.S. Pat. No. 5,308,670 to Saylor are all directed to various floor coverings.

As such a need exists to provide a means of providing a receptacle that collects fluids and waste liquids that are harmful to the pavement or ground. The receptacle must further be capable of functioning properly in heavy stop and go traffic, without having to clean the receptacle every day or high maintenance.

SUMMARY OF THE INVENTION

In accordance with one embodiment of the present invention a receptacle for the collection of fluids falling from a vehicle is provided. The receptacle includes a frame defined by a pair of sidewalls and a front and rear wall. The frame also includes wedges located at predetermined positions about the lower edge of the walls. A lower grate, a sorbent pad and an upper grate, all of which is received within the frame are positioned to rest on the wedges. The lower grate and upper sandwiching the sorbent pad in between provides a means to keep the sorbent pad flat, such that the sorbent pad may cover the entire area within the frame without bunching up in areas. The front and rear walls further include tapered sections, such that the receptacle may be anchored to the ground. In addition, the upper grate may also be hinged to the frame, providing an easier means to access the sorbent pad for periodic maintenance purposes. The preferred sorbent pad has properties that absorb various petroleum or gycol-based fluids while at the same time allowing water based fluids to seep through. The water may thereafter drain out of the frame through drain holes provided along the sidewalls or through the upper grate or may drain through the open bottom of the frame.

In other embodiments of the present invention the frame may include an impermeable bottom thereby defining a basin between the walls and the bottom, wherein the liquid may drain through the drain holes alone. In yet another embodiment the present invention may be placed indoors around or under a machine for catching the liquid waste falling therefrom.

Numerous other advantages and features of the invention will become readily apparent from the following detailed description of the invention and the embodiments thereof, from the claims, and from the accompanying drawings.

BRIEF DESCRIPTION OF THE DRAWINGS

A fuller understanding of the foregoing may be had by reference to the accompanying drawings, wherein.

DESCRIPTION OF THE EMBODIMENTS

Figure 1:
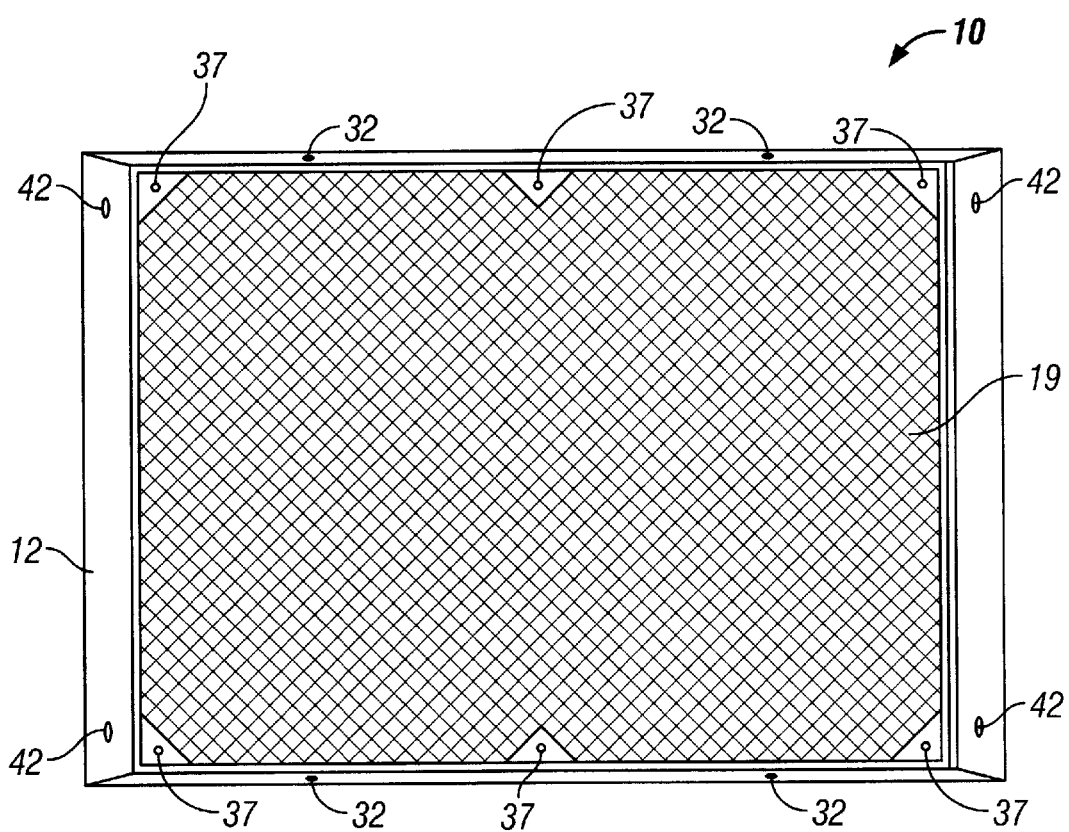
FIG. 1 is a top view of the receptacle for the collection of fluids in accordance with the present invention.

While the invention is susceptible to embodiments in many different forms, there are shown in the drawings and will be described herein, in detail, the preferred embodiments of the present invention. It should be understood, however, that the present disclosure is to be considered an exemplification of the principles of the invention and is not intended to limit the spirit or scope of the invention and/or claims of the embodiments illustrated.

Referring first to FIG. 1, an improved receptacle is shown and constructed in accordance with the present invention and generally referenced by numeral 10. The improved receptacle 10 provides for the means to collect various wastes or fluids that may drip or fall from a vehicle or machine but further provides for the means to allow water to drain therefrom. As such the improved receptacle 10 may be placed outside rather than only be used indoors and may be used in high traffic areas since the receptacle 10 does not require high maintenance.

Figure 2:
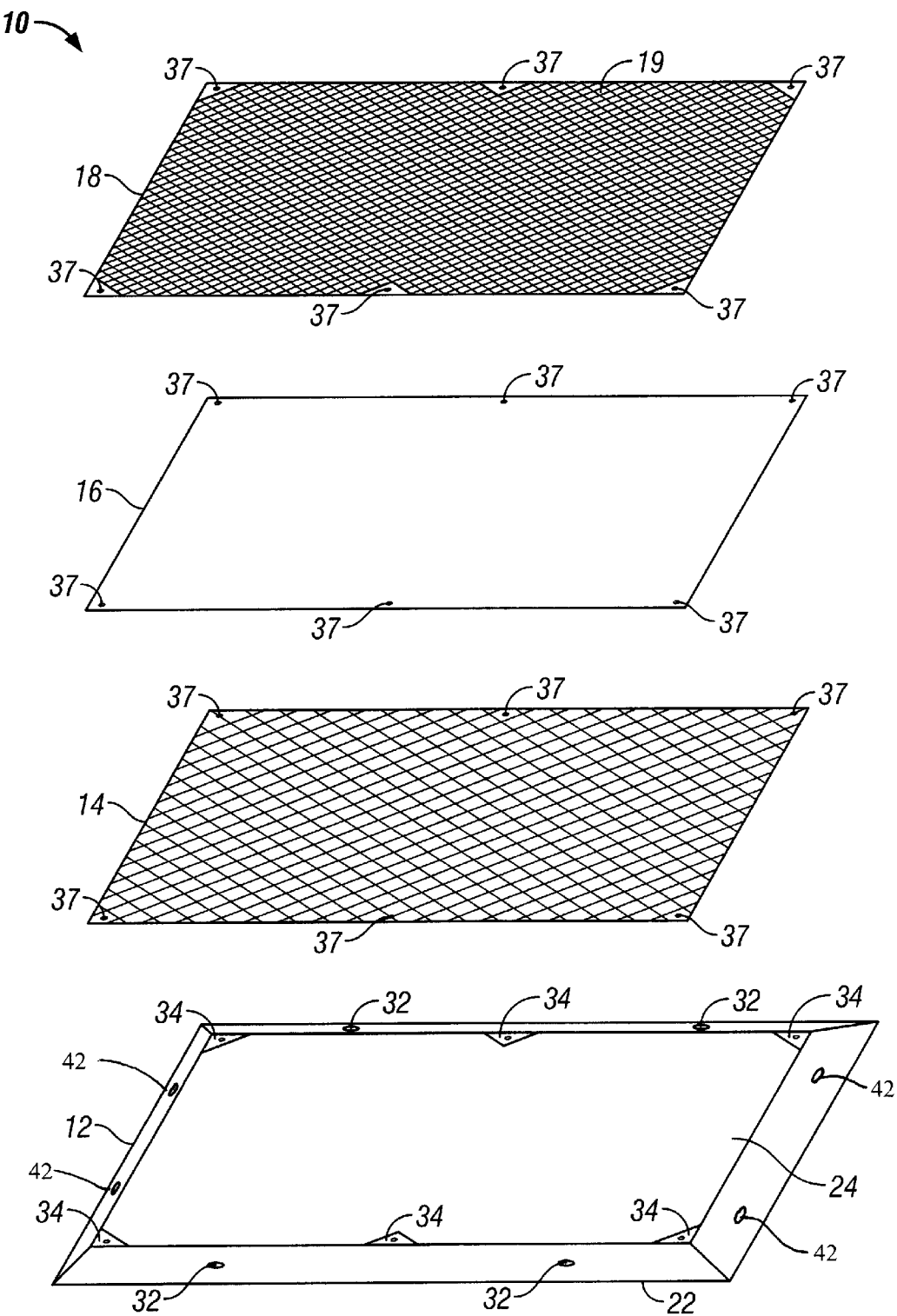
FIG. 2 is an exploded view of the receptacle from FIG. 1.
Figure 3A:
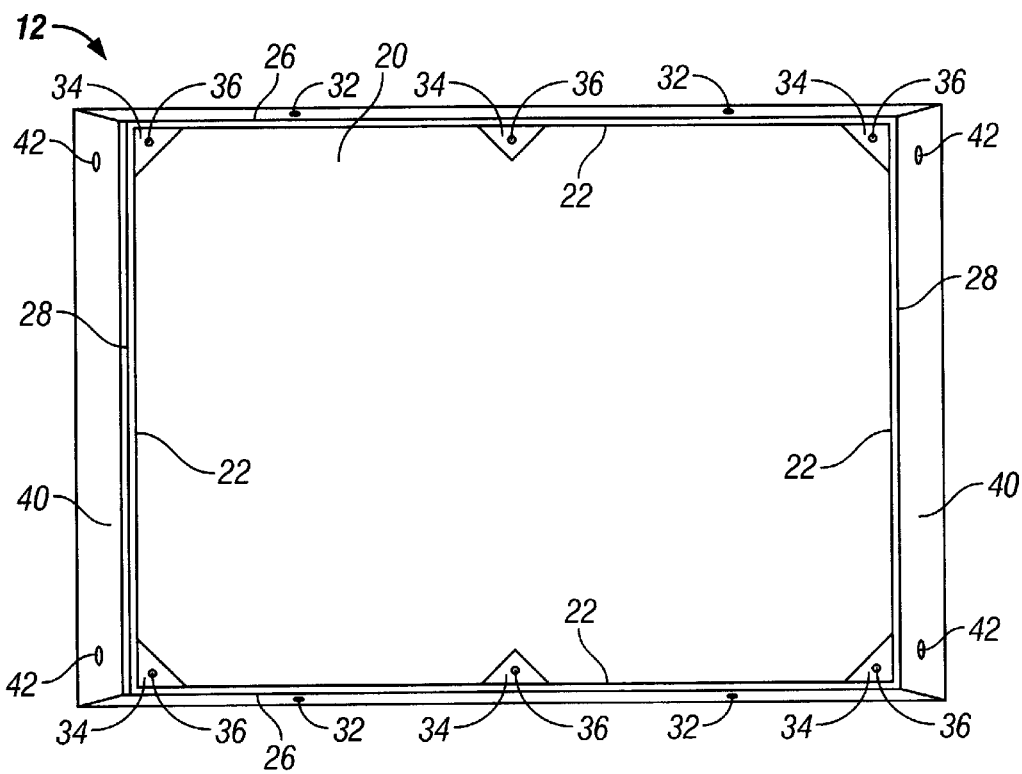
FIG. 3a is a top view of the frame without a bottom.

Referring also to FIG. 2, the receptacle 10 includes a frame 12 that accommodates a lower grate 14, a sorbent padding 16 and an upper grate 18. As best shown in FIG. 3a, the frame 12 is typically rectangular in shape; however, the overall shape or size of the frame 12 is immaterial, as such the dimensions of the frame may be custom designed for any specific need. The frame 12 is also preferably made from aluminum for cost effectiveness reasons but may be made from other stronger or lighter materials. The frame 12 includes a pair of sidewalls 26 and a front and rear wall 28, defining an opening 20 between such walls 26 and 28. Moreover, while shown in other embodiments, the receptacle 10 does not include a bottom. Each wall further has a predetermined height that may be determined separately for each additional receptacle 10. The predetermined height is defined between a lower edge 22 and an upper edge 24 (best seen in FIG. 2). The frame 12 further includes a plurality of drain holes 32 defined in the sidewalls 26, which as explained in greater detail also permit water to drain from the frame 12. In addition thereto the frame 12 includes tabs or wedges 34 located at predetermined locations, preferably about the lower edge 22.

The lower grate 14 may then be placed within the frame 12. The lower grate 14 rests on top of the wedges 34 thereby preventing the sorbent pad 16, which is placed over the lower grate 14, from falling through the opening 20, when the frame 12 is moved. The sorbent pad 16 preferably includes any well-known material that absorbs fluids, while specifically not retaining water. For instance, various well known 3M™ Petroleum Sorbent Rolls are specifically designed for absorbing oil and other petroleum-based fluids, while at the same time allowing water to seep through. Once the sorbent pad 16 is in place, the upper grate 18 may be placed thereon.

Both the lower and upper grates 14 and 18, respectively, may be made out of stainless steel for support, however, any material may be desired or used. The upper grate 18 includes a stainless steel mesh 19 such that the fluids and particles may fall through the upper grate 18 and onto the sorbent pad 16. The sorbent pad 16 when sandwiched between the upper and lower grates 18 and 14 is prevented from moving or shifting during use. While the lower grate 14 may be removed and the sorbent pad 16 placed directly in the frame 12, the sorbent pad 16 may have a tendency to move or shift while in use such that the sorbent pad 16 may not cover the entire opening 20. These uncovered areas may furthermore permit the fluids other than water, to drain out of the frame 12 and onto the ground, pavement or etc.

Figure 4:
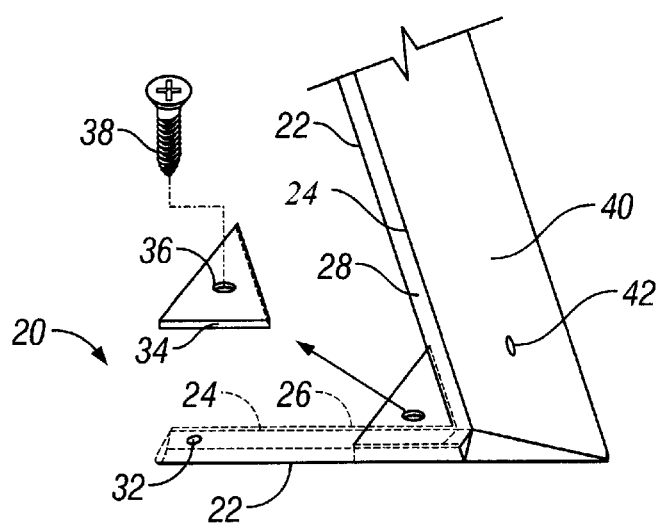
FIG. 4 is a partial perspective view of the wedges used to secure the components of the receptacle from FIG. 2, as well as illustrating another embodiment of the receptacle incorporating inwardly slanting sidewalls.

In order to secure the upper grate 18 to the frame 12, the wedges 34 may have a recess 36 sized to receive a bolt 38 (best shown in FIG. 4). In addition, the lower grate 14, sorbet pad 16, and upper grate 18 include apertures 37 that align with the recess 36 in each wedge 34. Once assembled, bolts 38 may be secured through the openings 37 and into the recess 36. However, other well known securing means may be used by the present invention to secure the upper grate 18 to the frame 12.

In addition, the front and rear walls 28 may include a tapered section 40 that extends outwardly. Anchor apertures 42 positioned within both tapered sections 40, permits the frame 12 to be secured to a flat surface, such that the receptacle 10 will not move or shift after it is placed on the ground or pavement. The upper grate 18 also lies flush with the sidewalls 26 and the front and rear walls 28 when assembled, therefore vehicles do not encounter any impedances while driving over the receptacle 10. To increase the stability to the upper grate 18 the sidewalls 26 may slant inwardly towards the center of the frame 12 (best seen in FIG. 4), defining a larger thickness at the lower edge 22 of the sidewall 26 than at the upper edge 24 of the sidewall 26.

The receptacle 10 is preferably built such that it fits between the wheel-base of a vehicle. As such, a vehicle would not physically drive over the receptacle 10 but when a car is idling over the receptacle 10, the receptacle 10 will still catch any fluids or wastes falling from the vehicle. However, the receptacle 10 may be designed larger then the wheel-base such that a vehicle would drive over it. Using the tapered sections 40 as a ramp, a vehicle may easily drive thereover.

Figure 3B:
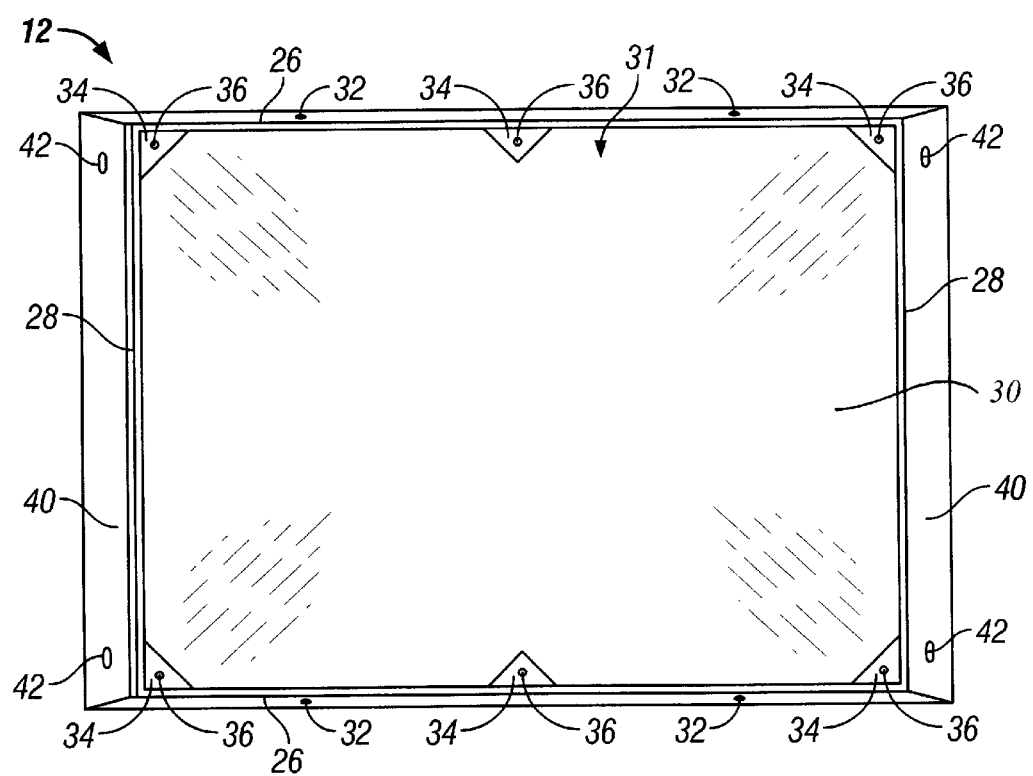
FIG. 3b is a top view of the frame with a bottom.

In yet other embodiment of the present invention, the frame 12 may include a base 30, shown in FIG. 3b, extending from the sidewalls 26 and the front and rear walls 28. As such the area within the walls 26 and 28 and the base 30 may form a basin 31. The base 30 is fluid tight thereby prohibiting any fluid from seeping therethrough, except through the drain holes 32. In such an embodiment the lower grate 14 may be replaced with another means to prevent to sorbent pad 16 from moving, for instance the basin 32 may include cleats that anchor into the lower portion of the sorbent pad 16. It is important to note that the recesses 36 in the wedges 34 would not extend through the base 30, since providing an opening in the base 30 may provide an undesirable means for the liquid to drain from the basin 31. In addition thereto, the base 30 may be the lower grate 14, such that the lower grate may be permanently affixed to the frame 12, thereby providing extra stability to the frame 12. While disclosed above, having an opening 20 in the frame 12 is preferred because it provides a means to circulate air through the receptacle 10. The preferred embodiment therefore, includes a opening 20 defined as the entire area between the walls, however, the opening 20 may be smaller, such as an aperture in the base 30 or a plurality of apertures in the base 30.

Figure 5:
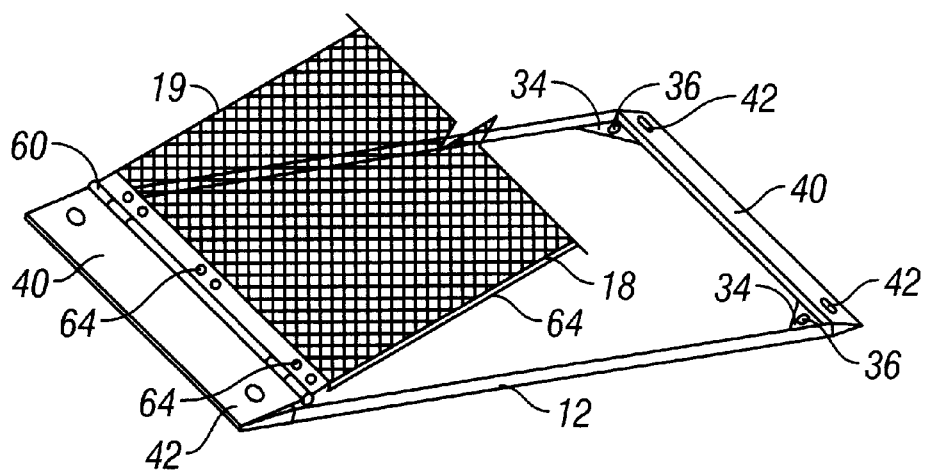
FIG. 5 is a partial perspective view of another embodiment of the receptacle having a hinged upper grate.
Figure 6:
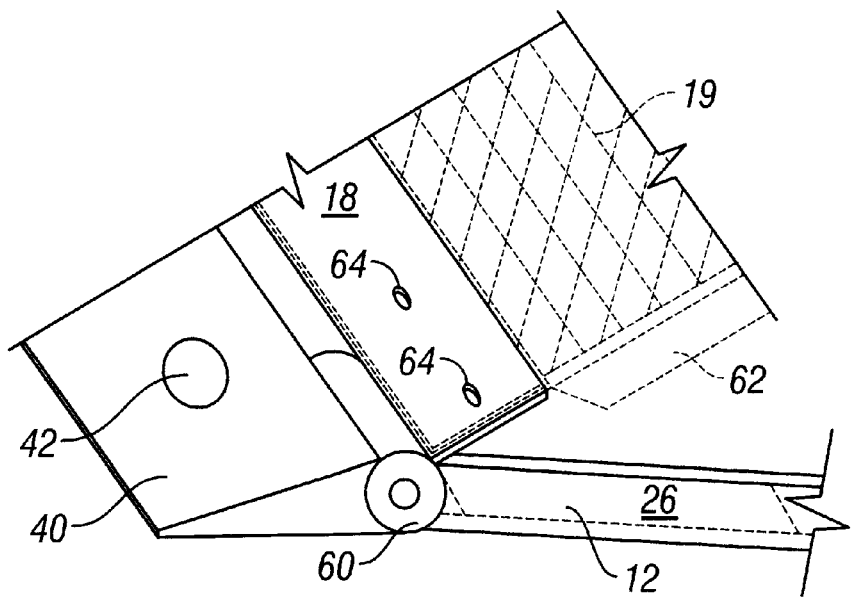
FIG. 6 is a partial and exploded perspective view of FIG. 5.

In another embodiment of the present invention, the upper grate 18 may attach to the frame 12 by a hinging means 60 at one end, FIGS. 5 and 6, providing for the easy removal and/or replacement of sorbent pads 16.

Alternatively, the upper grate 18 may include downwardly extending side edges 62 that engage the sidewalls 26 and are at a minimum of the same height as the sidewalls 26. These downwardly extending side edges 62 may provide the upper grate 18 with extra stability when vehicles are traveling over it and aid in the proper alignment of the upper grate 18 within the frame 12. When the upper grate 18 includes the downwardly extending side edges 62, the drain holes 66 will be moved to a position in the upper grate 18, since the downwardly extending side edges 62 will cover the drain holes 32 positioned along the sidewalls 26. In addition if the sidewalls 26 are also slanted the side edges 62 are similarly slanted to provide a frictional engagement between the upper grate 18 and the frame 12.

Once assembled, a sorbent pad 16 may be placed on top of the lower grate 14 within the frame 12 and the upper grate 18 may be secured thereon. The receptacle may then be secured to the asphalt or concrete pavement, in which heavy standing vehicle traffic is observed. Any fluid falling from a vehicle that has stopped or is idling over the receptacle 10 will fall through the meshing 19 on the upper grate 18 and onto the sorbent pad 16. Providing the sorbent pad 16 is of one of the types mentioned above, the sorbent pad 16 will absorb any and all petroleum and glycol-based fluids that may fall from or leak from a vehicle and will further repel water, which will drain from the receptacle 10 either through drain holes 32 or 64 or through the opening 20. The sorbent pad 16 may then be replaced or cleaned after an unspecified amount of time. If the upper grate 18 is hinged to the frame 12, then the upper grate 18 may be lifted at one end, otherwise the upper grate 18 may be completely removed.

The present invention may be used in any area that receives heavy stop and go traffic, such as drive through establishments like, restaurants, banks, and automatic teller machines, as well as toll booths, and ticket booths in front of parking garages. The present invention may also be placed in residential and commercial driveways. The present invention protects the pavement or asphalt and provides easy means of cleaning up liquids that may fall from a vehicle. It is also further contemplated that the present invention may be made with other lighter materials for indoor use, for instance in a machine shop or garage.

From the foregoing and as mentioned above, it will be observed that numerous variations and modifications may be effected without departing from the spirit and scope of the novel concept of the invention. It is to be understood that no limitation with respect to the specific methods and apparatus illustrated herein is intended or should be inferred.

I claim:

1. A receptacle for collecting fluids falling from a vehicle, comprising:
   a frame having two sidewalls and a front and rear wall, each wall extending upwardly predetermined height from a bottom portion to an upper portion, and an opening defined though the bottom portion of the frame extending between the walls;
   a plurality of wedges secured to the bottom portion of the walls of the frame;
   a plurality of drain holes in said sidewalls;
   a lower grate sized to be received between said walls of the frame and positioned on said plurality of wedges;
   an upper grate having a meshed screen, the upper grate sized to fit over said opening and lie flush with the upper portion; and
   a sorbent pad placed within said frame between the lower and upper grate and having properties that absorb fluids that may fall from a vehicle and properties that permit water to drain through, whereby when the water drains through the sorbent pad, the water may further drain through the drain holes and the opening of the frame.

2. The receptacle of claim 1 further comprising a fluid tight base extending between the bottom portion of the walls such that the water may only drain through the drain holes in the sidewalls.

3. The receptacle of claim 1, wherein the front and rear walls have outwardly extending tapered sections.

4. The receptacle of claim 3 further comprising a plurality of apertures defined in each tapered section such that the frame may be secured to a flat surface.

5. The receptacle of claim 1 further comprising a means for securing the upper grate to the frame.

6. The receptacle of claim 5, wherein the means for securing includes:
   a recess in each wedge sized to receiving a bolt; and
   a plurality of openings positioned in the lower grate, sorbent pad and upper grate aligned with said recesses in the wedges, wherein upon being aligned a bolt corresponding to each recess and aligned openings may secure the upper grate, sorbent pad and lower grate to the frame.

7. The receptacle of claim 1 wherein the upper grate further includes edges that extend downwardly for a predetermined height no greater than said predetermined height of the walls.

8. The receptacle of claim 1 wherein the upper grate is hingedly attached to the frame at the one end.

9. A receptacle for collecting fluids comprising:
   a frame having a bottom portion and walls extending upwardly from the bottom portion;
   at least one drain hole defined in said walls;
   a means for absorbing fluids except water, wherein the water may drain through the at least one drain hole, said absorbing means further being placed between said walls of said frame; and
   an upper grate removably secured to the frame above the absorbing means.

10. The receptacle of claim 9 further comprising an opening extending from each wall, through the bottom portion.

11. The receptacle of claim 10 further comprising a plurality of wedges secured to the walls about the bottom portion thereof.

12. The receptacle of claim 11 further comprising a lower grate positioned beneath the absorbing means and resting on the plurality of wedges.

13. The receptacle of claim 12, wherein two of the walls includes a tapered section extending outwardly from the frame.

14. The receptacle of claim 13, wherein the tapered sections further include anchor apertures such that the receptacle may be anchored to a pavement.

15. The receptacle of claim 14, wherein the upper grate is hingedly attached to the frame.

16. The receptacle of claim 15, wherein the upper grate includes at least two edges that extend downwardly towards the bottom portion of the frame and are of a height substantially equal to the height of the walls.

17. The receptacle of claim 16, wherein the walls have a predetermined thickness smaller along the bottom portion than along an upper portion defined on side walls.

18. A receptacle assembly for the collection of fluids and particles except water comprising:
   a frame sized to receive a sorbent padding having properties that absorb fluids except water, said frame further includes drain holes for draining said water;
   a sorbent padding;
   a lower grate attached to the frame below said sorbent padding; and
   an upper grate attached to the frame above said sorbent padding, said upper grate having a meshed area for permitting fluids and particles to fall therethrough to the sorbent padding.

19. The receptacle assembly of claim 18 further comprising:
   a opened bottom area defined in the frame; and
   a plurality of wedges secured to the frame wherein the lower grate may be positioned on said wedges such that the lower grate is prevented from falling through the opened bottom area.

20. The receptacle assembly of claim 19 further comprising a hinge for attaching the upper grate to the frame.

* * * * *